United States Patent
Batllo et al.

(10) Patent No.: US 12,536,117 B2
(45) Date of Patent: Jan. 27, 2026

(54) ENCRYPTION/DECRYPTION OF DIGITAL MESSAGE AND FURTHER CALCULATING AUTHENTICATION SIGNATURE FROM PREFIX AND HEADER OF DIGITAL MESSAGE

(71) Applicant: STMicroelectronics International N.V., Geneva (CH)

(72) Inventors: Jean-Christophe Batllo, Thorigné-Fouillard (FR); Zied Grissa, El Ghazala (TN); Delphine Le Goascoz, Grenoble (FR); Gwendhal Borremans, Le Mans (FR)

( * ) Notice: Subject to any disclaimer, the term of this patent is extended or adjusted under 35 U.S.C. 154(b) by 0 days.

(21) Appl. No.: 18/537,453

(22) Filed: Dec. 12, 2023

(65) Prior Publication Data

US 2024/0202148 A1    Jun. 20, 2024

(30) Foreign Application Priority Data

Dec. 16, 2022   (FR) ...................................... 2213568

(51) Int. Cl.
*G06F 13/00* (2006.01)
*G06F 13/28* (2006.01)
(52) U.S. Cl.
CPC .................. *G06F 13/28* (2013.01)
(58) Field of Classification Search
CPC ...................................................... G06F 13/28
See application file for complete search history.

(56) References Cited

U.S. PATENT DOCUMENTS

| 9,461,815 | B2 | * | 10/2016 | Wu |
| 10,181,946 | B2 | * | 1/2019 | Lal ........................ H04L 9/0631 |
| 10,185,678 | B1 | | 1/2019 | Stoler et al. |
| 2007/0073915 | A1 | * | 3/2007 | Go .......................... G06F 13/28 |
| | | | | 710/11 |

OTHER PUBLICATIONS

Dworkin, "Recommendation for Block Cipher Modes of Operation: The CCM Mode for Authentication and Confidentiality," National Institute of Standards and Technology (NIST) Special Publication 800-38C, May 2004, 27 pages, URL: https://nvlpubs.nist.gov/nistpubs/Legacy/SP/nistspecialpublication800-38c.pdf, retrieved Dec. 12, 2023.

* cited by examiner

*Primary Examiner* — Tammara R Peyton
(74) *Attorney, Agent, or Firm* — Seed Intellectual Property Law Group LLP

(57) ABSTRACT

A computer system includes a central processing unit, a peripheral circuit configured to process data having a first format, a memory configured to store data intended for the peripheral circuit, the data having a second format distinct from the first format. The system includes a direct memory access controller configured, during a transmission of data from the memory towards the peripheral circuit, to recover data intended for the peripheral circuit and stored in the memory, to modify the format of the recovered data to obtain data having the first format, and to transmit the data according to the first format to the peripheral circuit. The central processing unit is configured to initialize a data transmission from the memory towards the peripheral circuit via the direct memory access controller.

17 Claims, 2 Drawing Sheets

[Fig. 1]
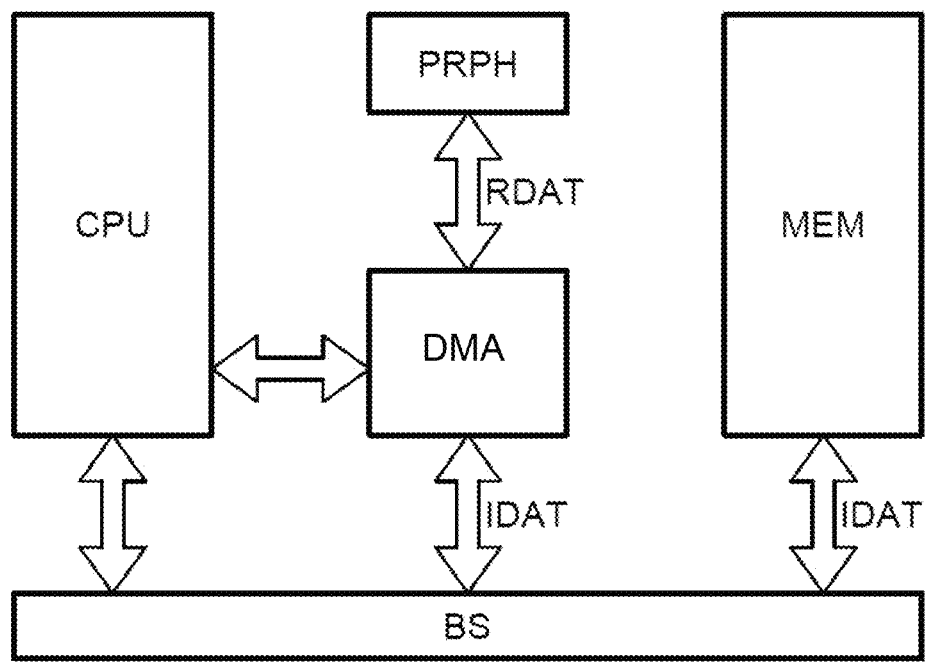
[Fig. 2]
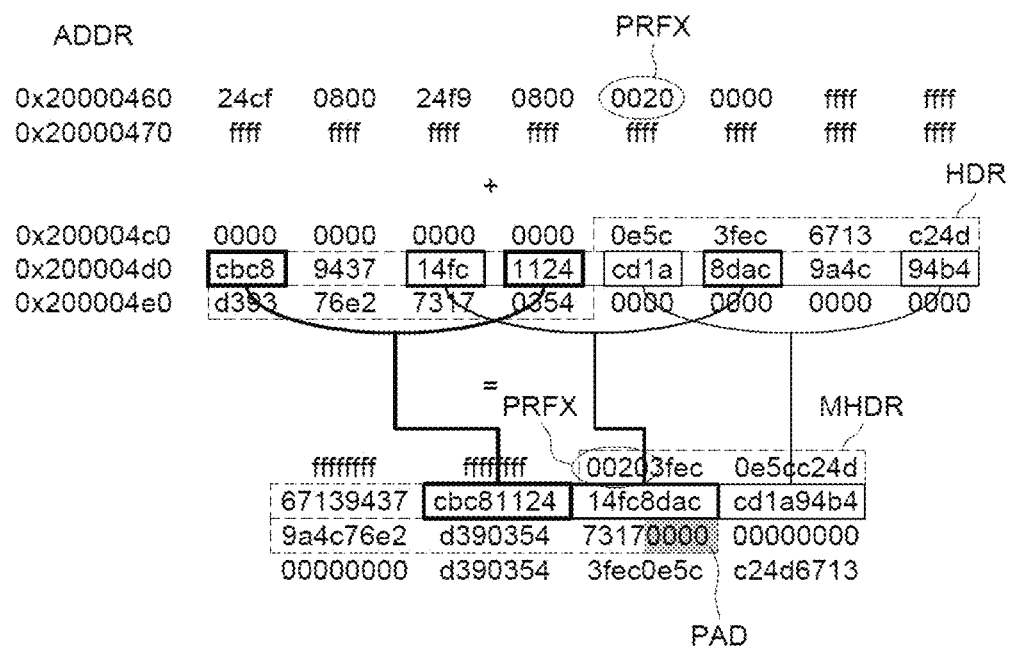

[Fig. 3]
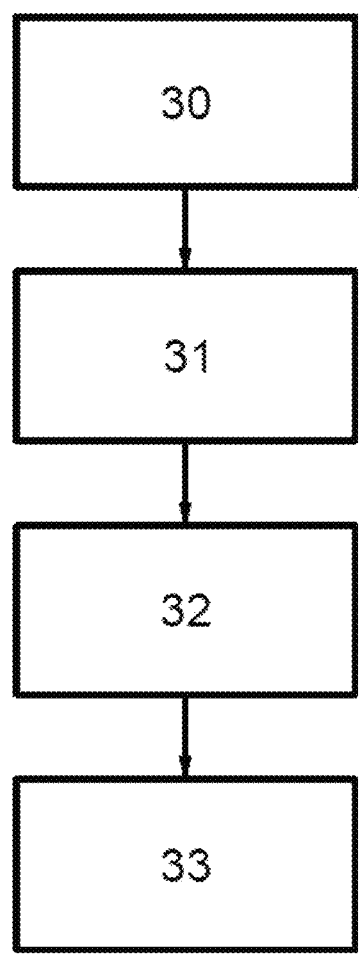

ENCRYPTION/DECRYPTION OF DIGITAL MESSAGE AND FURTHER CALCULATING AUTHENTICATION SIGNATURE FROM PREFIX AND HEADER OF DIGITAL MESSAGE

BACKGROUND

Technical Field

Embodiments and implementations relate to computer systems, in particular systems-on-chip.

Description of the Related Art

A computer system may include a central processing unit, a memory and at least one peripheral.

For example, the computer system may comprise, as a peripheral, an encryption/decryption circuit. In particular, the encryption/decryption circuit may be configured to carry out an encryption/decryption according to the "AES" (acronym of "Advanced Encryption Standard") standard. In particular, such an encryption/decryption circuit may use the "AES-CCM" (standing for "Counter with Cipher Block Chaining-Message Authentication Code") mode.

The "AES-CCM" encryption/decryption allows encrypting/decrypting a digital message, and uses an authentication signature ("authentication tag") calculated from a prefix and data of a header associated to said digital message. The authentication signature allows authenticating an integrity of the encrypted message to which this authentication signature is associated. The data of the header include information defined by the user. In turn, the prefix includes a piece of information on the length of the header, in particular encrypted according to the standard NIST Special Publication 800-38C. The prefix may have a size that varies according to the length of the header. For example, the prefix may be encoded over two, six or ten bytes.

The peripheral of the computer system may require receiving data in a defined format. This format may be different from a format of the data stored in the memory. Thus, the data stored in the memory cannot be transmitted directly to the peripheral.

In particular, when the peripheral is an "AES-CCM"-type encryption-decryption circuit, the peripheral requires receiving the prefix and the data of the header in a given format. In general, this format is different from that used to store this prefix and these header data in the memory.

More particularly, the encryption/decryption circuit may require concatenating the prefix with the data of the header, while the memory may be configured to store the prefix and the data of the header separately.

Furthermore, the peripheral may require receiving data by digital words including a number of bytes which may be different from the number of bytes of the digital words used to store the data in the memory.

Usually, the central processing unit is configured to duplicate the data stored in the memory intended for the peripheral in order to modify their format afterwards to adapt it to that one required by the peripheral. The modification of the format of the data is then carried out by software. Afterwards, the reformatted data are transmitted to the peripheral directly or via a direct memory access controller.

For example, the central processing unit is used to concatenate the prefix and the header data associated with a message to be encrypted/decrypted in order to obtain a reformatted header.

The duplication of the data by the central processing unit results in a considerable usage of the memory and a considerable processing time.

BRIEF SUMMARY

Embodiments of the present disclosure allow transmitting data stored in a memory to a peripheral circuit in a simplified manner in order to limit the memory usage and the processing time required for this data transmission.

According to one embodiment, a computer system includes a central processing unit, a peripheral circuit configured to process data having a first format, a memory configured to store data intended for the peripheral, circuit the data having a second format distinct from the first format. The computer system includes direct memory access controller configured, during a transmission of data from the memory towards the peripheral circuit, to: recover data intended for the peripheral circuit and stored in the memory, then modify the format of the recovered data to obtain data having said first format, then transmit the data according to said first format to the peripheral circuit, the central processing unit being configured to initialize a data transmission from the memory towards the peripheral circuit via the direct memory access controller.

Hence, such a direct memory access controller allows reformatting the data stored in the memory during transmission thereof to the peripheral circuit. Hence, the modification of the format of the data is carried out directly by the direct memory access controller, and not by software by the central processing unit.

Such a modification of the format of the data does not require any duplication of the data recovered from the memory. Hence, such a direct memory access controller allows transmitting the data to the peripheral circuit in a simplified manner while limiting the memory usage required for the transmission of these data. The direct memory access controller allows quickly carrying out a data transmission from the memory towards the peripheral circuit.

In particular, the computer system may be a system-on-chip.

In an advantageous embodiment, the data intended for the peripheral circuit include digital words encoded over several bytes, the bytes of the digital words being ordered in the memory according to said second format, the direct memory access controller is configured to recover the bytes of the digital words in the memory and to order them according to said first format before transmitting them to the peripheral circuit.

Advantageously, the bytes of said digital words are stored at data addresses of the memory, the central processing unit being configured to program the direct memory access controller to enable the latter to determine the addresses of the digital words to access the memory according to said second format.

Preferably, the memory is configured to store N-byte digital words, N being an integer, the peripheral circuit being configured to receive and then process M-byte digital words, M being an integer multiple of N, the direct memory access controller being configured to assemble M/N N-byte digital words stored in the memory so as to obtain a M-byte digital word, then to transmit this M-byte digital word to the peripheral circuit.

In an advantageous embodiment, N is equal to two and M is equal to four.

Preferably, the peripheral circuit is an encryption/decryption circuit configured to encrypt/decrypt a digital message stored in said memory and to calculate an authentication signature from a prefix and data of a header associated to said digital message, the memory being configured to separately store the data of the header and said prefix.

Advantageously, the direct memory access controller is configured to concatenate the prefix and the data of the header so as to obtain a reformatted header, then to transmit the reformatted header to the encryption/decryption circuit.

Advantageously, the stored data of the header include digital words encoded over several bytes, the bytes of these digital words being ordered in the memory according to said second format, the direct memory access controller is configured to recover the bytes of these digital words from the data of the header in the memory and to order them according to said first format before transmitting them to the peripheral circuit.

According to another aspect, a method is provided for transmitting data towards a peripheral circuit of a computer system configured to process data having a first format from a memory configured to store data intended for the peripheral circuit and having a second format distinct from the first format. The computer system further includes a central processing unit and a direct memory access controller. The method includes initializing, by the central processing unit, the data transmission from the memory towards the peripheral circuit via the direct memory access controller, then recovering, by the direct memory access controller, the data intended for the peripheral circuit and stored in the memory, then modifying, by the direct memory access controller, the format of the recovered data to obtain data having said first format, then transmitting, by the direct memory access controller, the data according to said first format to the peripheral circuit.

Such a method has similar advantages as those mentioned before for the computer system.

In an advantageous implementation, the data intended for the peripheral circuit include digital words encoded over several bytes, the bytes of the digital words being ordered in the memory according to said second format, the method including recovering, by the direct memory access controller, the bytes of the digital words in the memory then ordering these bytes of the digital words according to said first format by the direct memory access controller, then transmitting by the direct memory access controller these bytes of the digital words ordered according to said first format to the peripheral circuit.

Advantageously, the bytes of said digital words are stored at data addresses of the memory, the recovery of the bytes of the digital words in the memory including determining, by the direct memory access controller, the addresses of the bytes of the digital words to access in the memory according to said second format.

Preferably, the memory is configured to store N-byte digital words, N being an integer, the peripheral circuit being configured to receive and then process M-byte digital words, M being an integer multiple of N, the method including assembling, by the direct memory access controller, M/N N-byte digital words stored in the memory so as to obtain a M-byte digital word, then transmitting this M-byte digital word to the peripheral circuit.

In an advantageous implementation, N is equal to two and M is equal to four.

Preferably, the peripheral circuit is an encryption/decryption circuit configured to encrypt/decrypt a digital message stored in said memory and to calculate an authentication signature from a prefix and data of a header associated to said digital message, the memory being configured to separately store the data of the header and said prefix.

Advantageously, the modification of the format of the data by the direct memory access controller includes a concatenation of the prefix and of the data of the header so as to obtain a reformatted header, this reformatted header being transmitted afterwards to the encryption/decryption circuit by the direct memory access controller.

In an advantageous implementation, the stored data of the header include digital words encoded over several bytes, the bytes of these digital words being ordered in the memory according to said second format, the method including recovering, by the direct memory access controller, the bytes of the digital words of the header in the memory then ordering these bytes of the digital words of the header according to said first format by the direct memory access controller, then transmitting by the direct memory access controller these bytes of the digital words of the header ordered according to said first format to the peripheral circuit.

BRIEF DESCRIPTION OF THE SEVERAL VIEWS OF THE DRAWINGS

Other advantages and features of the disclosure will appear upon examining the detailed description of non-limiting embodiments, and from the appended drawings wherein:

FIG. 1 is a block diagram of a computer system, according to one embodiment.

FIG. 2 illustrates an example of a prefix and of header data stored in a memory of the computer system of claim 1, according to one embodiment.

FIG. 3 shows embodiments and implementations of the disclosure.

DETAILED DESCRIPTION

FIG. 1 illustrates an embodiment of a computer system SYS. In particular, this computer system SYS may be a system-on-chip (also referred to by the acronym "SoC" standing for "system-on-chip"). The computer system SYS includes a central processing unit CPU, a memory MEM, at least one peripheral circuit PRPH and a direct memory access controller DMA.

FIG. 1 illustrates one single peripheral circuit PRPH. Nevertheless, it is possible to provide for several peripheral circuits PRPH.

In this embodiment, the peripheral circuit PRPH is an encryption/decryption circuit configured to enable encrypting/decrypting a digital message.

In particular, the encryption/decryption circuit PRPH may be configured to carry out an encryption/decryption according to the standard "AES" (acronym of "Advanced Encryption Standard").

In particular, such an encryption/decryption circuit PRPH may use the "AES-CCM" (standing for "Counter with Cipher Block Chaining-Message Authentication Code") mode. Such an encryption/decryption circuit is well known to a person skilled in the art.

The "AES-CCM" encryption/decryption allows encrypting/decrypting a digital message, and uses an authentication signature ("authentication tag") calculated from a prefix and data of a header associated to said digital message. The authentication signature allows authenticating an integrity of the encrypted message to which this authentication signature is associated. The data of the header include information defined by the user. In turn, the prefix includes a piece of information on the length of the header, in particular encrypted according to the standard NIST Special Publication 800-38C. The prefix may have a size that varies according to the length of the header. For example, the prefix may be encoded over two, six or ten bytes.

The computer system SYS further includes a computer bus BS which is shared between the central processing unit CPU, the memory MEM, and the direct memory access controller DMA.

Moreover, the direct memory access controller DMA is also electrically connected to the peripheral circuit PRPH.

The direct memory access controller DMA is configured to enable the peripheral circuit PRPH to recover data stored in the memory MEM, without any intervention of the central processing unit CPU.

In particular, the central processing unit CPU is simply configured to initialize the data transmission from the memory MEM towards the peripheral circuit PRPH. In particular, the central processing unit CPU is configured to start an internal clock of the direct memory access controller DMA. Then, the central processing unit CPU is configured to initialize this direct memory access controller DMA by indicating the addresses of the data to be read (those of the prefix and those of the header) and by indicating the format of the data in the memory and the data format required by the peripheral circuit PRPH. Afterwards, the central processing unit CPU activates the direct memory access controller DMA then the peripheral circuit PRPH. The peripheral circuit PRPH then sends a signal to the direct memory access controller DMA to inform it that it is ready to receive data in order to start the transmission.

The memory MEM is a non-volatile memory. The memory MEM is configured to store data in a given format.

For example, this format depends on how the data are stored in this memory MEM. In particular, this format may depend on an endianness method ("endianness") implemented for the storage of the data in the memory MEM.

More particularly, each data is stored in the memory MEM over at least one digital word of at least one byte. The endianness defines the order in which the bytes of the digital words are stored in the memory MEM.

For example, the memory MEM may be configured to store data in two-byte (16 bits) digital words.

Some data stored in the memory MEM may be intended for the peripheral circuit PRPH. For example, when the peripheral circuit PRPH is an encryption/decryption circuit, the memory MEM may be configured to store the digital message to be encrypted/decrypted, the data of a header and a prefix associated to the digital message. The header data and the prefix are stored separately in the memory MEM.

The header data and the prefix are then recorded in the memory MEM according to a given format.

FIG. 2 illustrates an example of a prefix PRFX and of header data HDR stored in the memory MEM. The values of the data stored in the memory MEM are herein represented in a hexadecimal system. The memory MEM is herein configured to store data on two-byte digital words.

For example, the prefix PRFX is represented over one single two-byte digital word having the value "0020". This digital word is stored at the address ADDR 0x20000468 of the memory MEM. The header data HDR are represented over sixteen two-byte digital words. These digital words are stored starting from the address ADDR 0x200004c8 up to the address 0x200004e7.

The peripheral circuit PRPH is configured to process the data stored in the memory MEM which are intended thereto.

Nonetheless, the peripheral circuit may require receiving data in a data format different from the format of the data stored in the memory MEM.

In particular, when the peripheral circuit PRPH is an encryption/decryption circuit, the peripheral circuit PRPH may require receiving the header data and the prefix according to a given format. For example, the peripheral circuit PRPH may require a concatenation of the prefix to the header data. The peripheral circuit PRPH may require receiving bytes of the digital words of the data according to a data order which may be different from the order used to store the bytes of the digital words in the memory MEM.

In order to provide the peripheral circuit PRPH with data compliant with the format required thereby, the direct memory access controller DMA is configured to modify the format of the data stored in the memory MEM and intended for the peripheral circuit PRPH before transmitting them to the latter.

More particularly, the direct memory access controller DMA has an input configured to receive data IDAT from the memory MEM via the computer bus BS.

In particular, the direct memory access controller DMA is configured to receive at the input data IDAT in the data format of the memory MEM. For example, the direct memory access controller is configured to receive at the input two-byte (16 bits) digital words from the memory MEM.

The direct memory access controller DMA is configured to modify the format of these data it receives at the input to make them compliant with the format required by the peripheral circuit PRPH.

The direct memory access controller DMA also includes an output configured to deliver to the peripheral circuit PRPH data RDAT reformatted according to the format required by the peripheral circuit PRPH. In particular, the direct memory access controller DMA is configured to deliver at the output digital words over two bytes (32 bits) resulting from the assembly of two two-bytes (16 bits) digital words received at the input.

In particular, the direct memory access controller DMA includes a circuit (not represented) having a queue-type structure (also known by the acronym "FIFO", standing for "First In, First Out"). This circuit is configured to receive two-byte digital words and to reorder them and assemble them so as to deliver four-byte digital words at the output of the direct memory access controller DMA.

In particular, the direct memory access controller DMA is configured to access digital words to be assembled located at two different addresses of the memory, knowing the spacing between these two addresses. Such a direct memory access controller then uses a two-dimensional addressing ("2D DMA") well known to a person skilled in the art.

More particularly, when the peripheral circuit PRPH is a "AES-CCM"-type encryption/decryption circuit, the direct memory access controller DMA is configured to concatenate a prefix to the header data associated to a message to be encrypted, so as to obtain a header reformatted according to the format required by the peripheral circuit. Afterwards, this reformatted header is delivered to the peripheral circuit PRPH.

For example, FIG. 2 illustrates a header MHDR reformatted by the direct memory access controller DMA. This reformatted header MHRDR has the prefix PRFX "0020" concatenated with the header data HDR stored in the memory MEM.

The two-byte digital words stored in the memory MEM have been reorganized and assembled so as to obtain four-byte digital words in the reformatted header MHDR. For example, the digital word "cbc8" and the digital word "1124" of the header data HDR have been assembled by the direct memory access controller DMA so as to obtain the digital word "cbc81124".

The direct memory access controller DMA may also add padding bytes ("padding bytes") at the end of the reformatted header MHDR. For example, in FIG. 2, the reformatted header includes two padding bytes PAD with the value "0000".

The direct memory access controller DMA may be programmed by the central processing unit CPU via the computer bus BS.

Programming of the direct memory access controller DMA allows indicating thereto how to modify the format of the data stored in the memory MEM and intended for the peripheral circuit PRPH. In particular, the direct memory access controller DMA is programmed to enable it to know in which order the data in the memory MEM should be read so as to reorder them at the output.

Such a direct memory access controller allows directly modifying the format of the data stored in the memory, without any intervention of the central processing unit. In particular, the direct memory access controller allows modifying the format of the header by adding the prefix thereto before transmitting it to the peripheral circuit.

Thus, such a computer system is configured to avoid a duplication of the data stored in the memory to modify their format before transmitting them to the peripheral circuit. Indeed, the use of the direct memory access controller to modify the format of the data stored in the memory does not require duplicating these data. This allows limiting the usage of the memory for the transmission of data to the peripheral circuit. Thus, this allows using a memory with a reduced size.

FIG. 3 illustrates a method for transmitting data from a memory MEM towards a peripheral circuit PRPH of a computer system SYS as described before.

The method includes initializing 30 the transmission of data stored in the memory MEM to the peripheral circuit PRPH. This initialization is carried out by the central processing unit CPU.

Afterwards, the method includes recovering 31 by the direct memory access controller DMA said data stored in the memory MEM. The format of the recovered data is compliant with the format used for the storage of the data in the memory MEM.

Then, the method includes modifying 32 the format of recovered data. In this step, the direct memory access controller DMA converts the format of the recovered data so as to make them compliant with the format required by the peripheral circuit PRPH.

In particular, when the peripheral circuit PRPH is an encryption/decryption circuit, the direct memory access controller concatenates the prefix and the header data stored in the memory MEM.

The direct memory access controller may also modify the order of the digital words of the recovered data and assemble the digital words so as to obtain new digital words having a larger number of bytes. In particular, the direct memory access controller may assemble two two-byte (16 bits) digital words in order to obtain four-byte (32 bits) digital words.

These operations allow obtaining a reformatted header in which the prefix and the header data recovered from the memory MEM are concatenated.

Afterwards, the method includes transmitting 33 the reformatted data to the peripheral circuit PRPH. For example, the method includes transmitting the reformatted header to the peripheral circuit PRPH.

Of course, the present disclosure is open to various variants and modifications that could appear to a person skilled in the art. For example, the peripheral circuit may be a video data processing circuit for example. In particular, each pixel may be encrypted according to three primary color components (for example red, green, blue), each component being encoded by a digital number stored in the memory according to a predetermined format. For reasons related to compression and memory savings, it is possible to modify the order in which the components are stored in their initial format to reorder them in a different format, or more simply to proceed with the decimation and reordering of the pixels so as to reduce the number of information of the video stream. The direct memory access controller is then configured to adapt the format of the pixels between the memory and the video data processing circuit.

A computer system may be summarized as including: a central processing unit (CPU), a peripheral circuit (PRPH) configured to process data having a first format, a memory (MEM) configured to store data intended for the peripheral circuit, the data having a second format distinct from the first format, a direct memory access controller (DMA) configured, during a transmission of data from the memory (MEM) towards the peripheral circuit (PRPH), to recover data intended for the peripheral circuit (PRPH) and stored in the memory (MEM), then modify the format of the recovered data to obtain data having said first format, then transmit the data according to said first format to the peripheral circuit (PRPH), the central processing unit (CPU) being configured to initialize a data transmission from the memory (MEM) towards the peripheral circuit (PRPH) via the direct memory access controller (DMA).

The data intended for the peripheral circuit (PRPH) may include digital words encoded over several bytes, the bytes of the digital words being ordered in the memory (MEM) according to said second format, the direct memory access controller (DMA) may be configured to recover the bytes of the digital words in the memory (MEM) and to order them according to said first format before transmitting them to the peripheral circuit (PRPH).

The bytes of said digital words may be stored at data addresses of the memory (MEM), the central processing unit (CPU) being configured to program the direct memory access controller (DMA) to enable the latter to determine the addresses of the digital words to access the memory (MEM) according to said second format.

The memory (MEM) may be configured to store N-byte digital words, N being an integer, the peripheral circuit (PRPH) being configured to receive and then process M-byte digital words, M being an integer multiple of N, the direct memory access controller (DMA) being configured to assemble M/N N-byte digital words stored in the memory (MEM) so as to obtain a M-byte digital word, then to transmit this M-byte digital word to the peripheral circuit (PRPH).

N may be equal to two and M may be equal to four.

The peripheral circuit (PRPH) may be an encryption/decryption circuit configured to encrypt/decrypt a digital message stored in said memory (MEM) and to calculate an authentication signature from a prefix and data of a header associated to said digital message, the memory being configured to separately store the data of the header and said prefix.

The direct memory access controller (DMA) may be configured to concatenate the prefix and the data of the header so as to obtain a reformatted header, then to transmit the reformatted header to the encryption/decryption circuit.

The stored data of the header may include digital words encoded over several bytes, the bytes of these digital words being ordered in the memory according to said second format, the direct memory access controller (DMA) may be configured to recover the bytes of these digital words from the data of the header in the memory and to order them according to said first format before transmitting them to the peripheral circuit (PRPH).

A method for transmitting data towards a peripheral circuit (PRPH) of a computer system (SYS) configured to process data having a first format from a memory (MEM) configured to store data intended for the peripheral circuit, the data stored in the memory having a second format distinct from the first format, the computer system (SYS) further including a central processing unit (CPU) and a direct memory access controller (DMA), the method may be summarized as including: initializing (30), by the central processing unit (CPU), the data transmission from the memory (MEM) towards the peripheral circuit (PRPH) via the direct memory access controller (DMA), then—recovering (31), by the direct memory access controller (DMA), the data intended for the peripheral circuit (PRPH) and stored in the memory (MEM), then modifying (32), by the direct memory access controller (DMA), the format of the recovered data to obtain data having said first format, then transmitting (33), by the direct memory access controller (DMA), the data according to said first format to the peripheral circuit (PRPH).

The data intended for the peripheral circuit (PRPH) may include digital words encoded over several bytes, the bytes of the digital words being ordered in the memory (MEM) according to said second format, the method including recovering, by the direct memory access controller (DMA), the bytes of the digital words in the memory (MEM) then ordering these bytes of the digital words according to said first format by the direct memory access controller (DMA), then transmitting by the direct memory access controller (DMA) these bytes of the digital words ordered according to said first format to the peripheral circuit (PRPH).

The bytes of said digital words may be stored at data addresses of the memory (MEM), the recovery of the bytes of the digital words in the memory (MEM) including determining, by the direct memory access controller (DMA), the addresses of the bytes of the digital words to access in the memory (MEM) according to said second format.

The memory (MEM) may be configured to store N-byte digital words, N being an integer, the peripheral circuit (PRPH) being configured to receive and then process M-byte digital words, M being an integer multiple of N, the method including assembling, by the direct memory access controller (DMA), M/N N-byte digital words stored in the memory (MEM) so as to obtain a M-byte digital word, then transmitting this M-byte digital word to the peripheral circuit (PRPH).

N may be equal to two and M may be equal to four.

The peripheral circuit (PRPH) may be an encryption/decryption circuit configured to encrypt/decrypt a digital message stored in said memory (MEM) and to calculate an authentication signature from a prefix and data of a header associated to said digital message, the memory being configured to separately store the data of the header and said prefix.

The modification of the format of the data by the direct memory access controller (DMA) may include a concatenation of the prefix and of the data of the header so as to obtain a reformatted header, this reformatted header being transmitted afterwards to the encryption/decryption circuit by the direct memory access controller (DMA).

The stored data of the header may include digital words encoded over several bytes, the bytes of these digital words being ordered in the memory according to said second format, the method including recovering, by the direct memory access controller (DMA), the bytes of the digital words of the header in the memory (MEM) then ordering these bytes of the digital words of the header according to said first format by the direct memory access controller (DMA), then transmitting by the direct memory access controller (DMA) these bytes of the digital words of the header ordered according to said first format to the peripheral circuit (PRPH).

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A computer system, comprising:
a central processing unit;
a peripheral circuit configured to process data having a first format;
a memory configured to store data intended for the peripheral circuit, the data having a second format distinct from the first format; and
a direct memory access controller configured, during a transmission of data from the memory towards the peripheral, to:
recover data intended for the peripheral and stored in the memory;
modify the format of the recovered data to obtain data having the first format; and
transmit the recovered data with the first format to the peripheral circuit, the central processing unit being configured to initialize a data transmission from the memory towards the peripheral circuit via the direct memory access controller, wherein the peripheral circuit is an encryption/decryption circuit configured to encrypt/decrypt a digital message stored in the memory and to calculate an authentication signature from a prefix and data of a header associated to the digital message, the memory being configured to separately store the data of the header and the prefix.

2. The computer system according to claim 1, wherein the data intended for the peripheral includes digital words encoded over several bytes, the bytes of the digital words being ordered in the memory according to the second format, the direct memory access controller is configured to recover the bytes of the digital words in the memory and to order them according to the first format before transmitting them to the peripheral circuit.

3. The computer system according to claim 2, wherein the bytes of the digital words are stored at data addresses of the memory, the central processing unit being configured to program the direct memory access controller to enable the latter to determine the addresses of the digital words to access the memory according to the second format.

4. The computer system according to claim 2, wherein the memory is configured to store N-byte digital words, N being an integer, the peripheral circuit being configured to receive and then process M-byte digital words, M being an integer multiple of N, the direct memory access controller being configured to assemble M/N N-byte digital words stored in the memory so as to obtain a M-byte digital word, then to transmit this M-byte digital word to the peripheral.

5. The computer system according to claim 4, wherein N is equal to two and M is equal to four.

6. The computer system according to claim 1, wherein the direct memory access controller is configured to concatenate the prefix and the data of the header so as to obtain a reformatted header, then to transmit the reformatted header to the encryption/decryption circuit.

7. The computer system according to claim 6, wherein the stored data of the header includes digital words encoded over several bytes, the bytes of these digital words being ordered in the memory according to the second format, the direct memory access controller is configured to recover the bytes of these digital words from the data of the header in the memory and to order them according to the first format before transmitting them to the peripheral circuit.

8. A method, comprising:
initializing, by a central processing unit of computer system, data transmission from a memory of the computer system towards a peripheral circuit of the computer system via a direct memory access controller of the system, the memory configured to store data intended for the peripheral circuit, the peripheral circuit configured to process data having a first format;
recovering, by the direct memory access controller, the data intended for the peripheral circuit and stored in the memory;
modifying, by the direct memory access controller, a format of the recovered data to obtain data having the first format; and
transmitting, by the direct memory access controller, the data according to the first format to the peripheral circuit, wherein the peripheral circuit is an encryption/decryption circuit configured to encrypt/decrypt a digital message stored in the memory and to calculate an authentication signature from a prefix and data of a header associated to the digital message, the memory being configured to separately store the data of the header and the prefix.

9. The method according to claim 8, wherein the data intended for the peripheral circuit includes digital words encoded over several bytes, the bytes of the digital words being ordered in the memory according to a second format, the method comprising:
recovering, by the direct memory access controller, the bytes of the digital words in the memory;
ordering the bytes of the digital words according to the first format by the direct memory access controller; and
transmitting by the direct memory access controller the bytes of the digital words ordered according to the first format to the peripheral circuit.

10. The method according to claim 9, wherein the bytes of the digital words are stored at data addresses of the memory, the recovery of the bytes of the digital words in the memory including determining, by the direct memory access controller, the addresses of the bytes of the digital words to access in the memory according to the second format.

11. The method according to claim 9, wherein the memory is configured to store N-byte digital words, N being an integer, the peripheral circuit being configured to receive and then process M-byte digital words, M being an integer multiple of N, the method comprising assembling, by the direct memory access controller, M/N N-byte digital words stored in the memory so as to obtain a M-byte digital word, then transmitting this M-byte digital word to the peripheral circuit.

12. The method according to claim 11, wherein N is equal to two and M is equal to four.

13. The method according to claim 8, wherein the modification of the format of the data by the direct memory access controller includes a concatenation of the prefix and of the data of the header so as to obtain a reformatted header, this reformatted header being transmitted afterwards to the encryption/decryption circuit by the direct memory access controller.

14. The method according to claim 13, wherein the stored data of the header includes digital words encoded over several bytes, the bytes of these digital words being ordered in the memory according to the second format, the method comprising:
recovering, by the direct memory access controller, the bytes of the digital words of the header in the memory;
ordering the bytes of the digital words of the header according to the first format by the direct memory access controller; and
transmitting by the direct memory access controller the bytes of the digital words of the header ordered according to the first format to the peripheral circuit.

15. A method, comprising:
recovering, with a direct memory access controller of a system, data intended for a peripheral circuit of the system and stored in a memory of the system, the peripheral circuit being configured to process data having a first format, the memory configured to store data intended for the peripheral circuit;
modifying, with the direct memory access controller, a format of the recovered data from a second format to the first format; and
transmitting, with the direct memory access controller, the recovered data with the first format to the peripheral circuit;
initializing, with a central processing unit of the system, a data transmission from the memory to the peripheral circuit via the direct memory access controller, wherein the data intended for the peripheral circuit includes digital words encoded over several bytes, the bytes of the digital words being ordered in the memory according to the second format;
recovering, by the direct memory access controller, the bytes of the digital words in the memory;
ordering the bytes of the digital words according to the first format by the direct memory access controller; and
transmitting by the direct memory access controller the bytes of the digital words ordered according to the first format to the peripheral circuit, wherein the bytes of the digital words are stored at data addresses of the memory, the recovery of the bytes of the digital words in the memory including determining, by the direct memory access controller, the addresses of the bytes of the digital words to access in the memory according to the second format.

16. The method according to claim 15, wherein the memory is configured to store N-byte digital words, N being an integer, the peripheral circuit being configured to receive and then process M-byte digital words, M being an integer multiple of N, the method comprising assembling, by the direct memory access controller, M/N N-byte digital words stored in the memory so as to obtain a M-byte digital word, then transmitting this M-byte digital word to the peripheral circuit.

17. The method according to claim 16, wherein N is equal to two and M is equal to four.

* * * * *